UNITED STATES PATENT OFFICE.

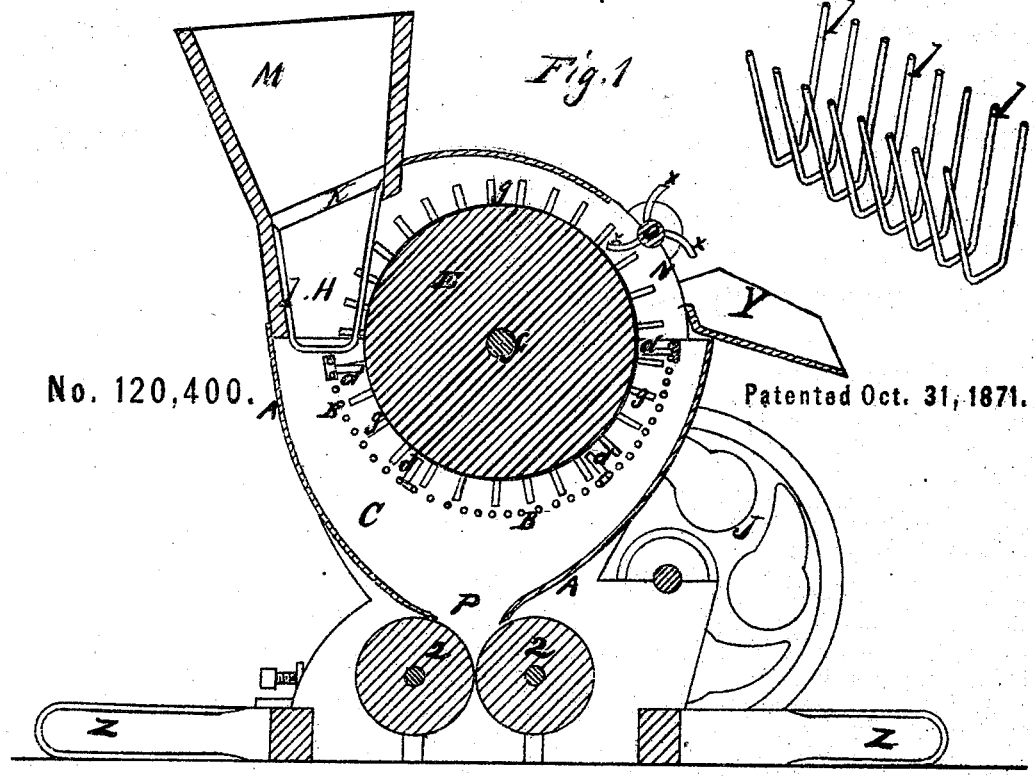
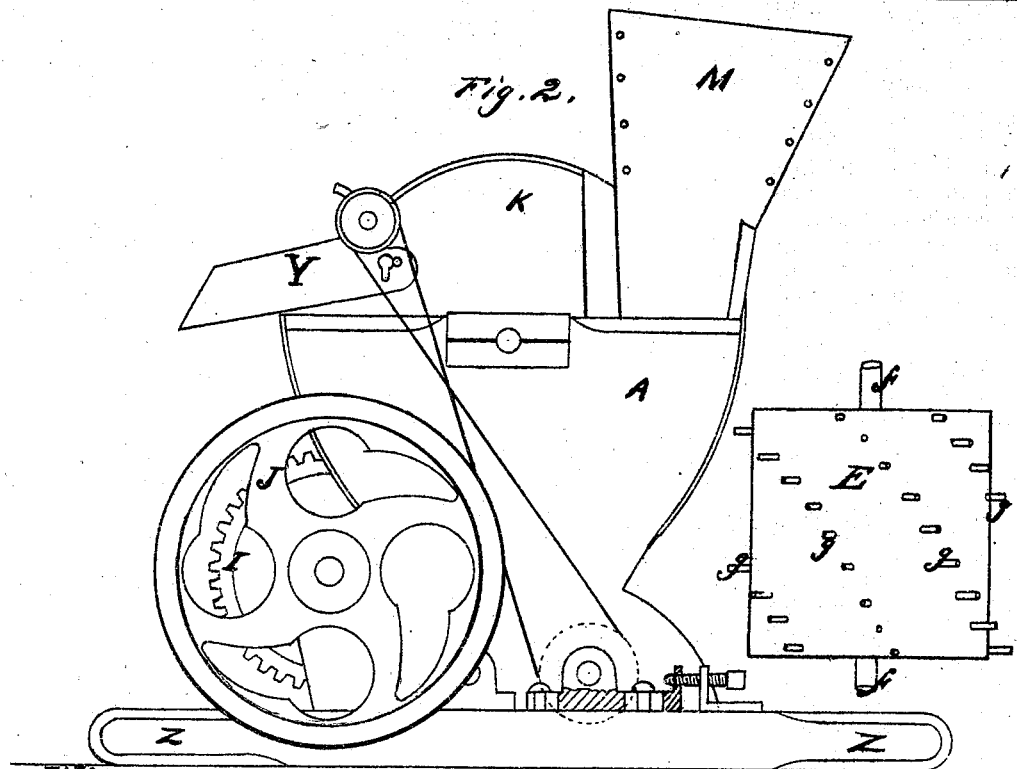

FERDINAND B. SCHOENSTEIN AND AUGUST KLEIN, OF SAN FRANCISCO, CAL.

IMPROVEMENT IN GRAPE-CRUSHERS.

Specification forming part of Letters Patent No. 120,400, dated October 31, 1871.

*To all whom it may concern:*

Be it known that we, FERDINAND B. SCHOENSTEIN and AUGUST KLEIN, of city and county of San Francisco, State of California, have invented an Improved Grape-Crusher; and we do hereby declare the following description and accompanying drawing are sufficient to enable any person skilled in the art or science to which it most nearly appertains to make and use our said invention or improvements without further invention or experiment.

Our invention relates to an improved machine for crushing grapes and other small fruit, and removing the stems, preparatory to placing them in a press for the purpose of extracting the juice for wine-making; and it consists of a properly shaped box, inside of which is a cylinder provided with teeth. This cylinder is revolved inside of a wire-cloth concave, which is also provided with teeth at each side. The bottom of the hopper, into which the grapes with their stems are thrown, is formed of bars similar to a grate, and the teeth of the cylinder pass between the bars and draw the grapes and stems down into the concave. After passing through the concave the stems are caught by teeth on an outside shaft and drawn to the outside upon an apron, from which they fall to the ground, while the crushed grapes fall between the concave and box and then to the bottom of the box, where they are passed between two pressing-rollers.

In order to more fully illustrate and explain our invention, reference is had to the accompanying drawing forming a part of this specification.

A represents a case or box having vertical ends and curving sides. Inside of this semi-cylindrical box is secured a wire-cloth or other perforated concave, B, so that a space, C, will be left between the concave and curving sides of the box. At each end of this concave, and at any other desired point or points across its interior, are arranged rows of teeth $d\ d$, which point inward. E is a cylinder, which is fixed upon a shaft, $f$, the journals of which bear in boxes on the opposite end of the case or box A, so that the cylinder may be revolved inside of the concave. Across the face of this cylinder teeth $g\ g$ are also secured in rows. These rows are preferably placed at an angle to the line of the cylinder, so that the drawing in of the grapes will be gradual and uniform. At one end of the shaft $f$ is a large gear-wheel, which engages with a gear-wheel, I. A crank is fixed upon the wheel I, by means of which the mill can be driven by hand-power. At the opposite end of the same shaft upon which the wheel I is secured, and at the opposite end of the box or case, is a fly-wheel, J, which may serve also as a driving-wheel when other power is used. A cover, K, fits down upon the box or case A, and has an opening at one end, in which is fixed a basket, H, composed of rods $l$, which are bent similar to grate-bars. These bars are placed at the same distance apart and in line with the teeth $d\ d$, on the concave, so that the teeth on the cylinder E will pass between them and each one will carry down with it a portion of the fruit in the basket. Above the basket a hopper, M, is secured, into which the fruit is placed. At the opposite end of the cover K is another opening, N, across which a shaft, O, is revolved, being driven by a belt from a pulley beneath. This shaft also carries teeth X, which are curved, as shown, and which serve to clear the stems from the teeth of the cylinder. By curving the teeth so that the back of the curve will catch the stems they will readily clear themselves, and are prevented from clogging. In the bottom of the semicircular box A is a slot, P, which extends from end to end of the box, and directly below the slot are two rollers, Q Q, which revolve upon shafts bearing in the ends of the box. These shafts are driven by toothed wheels which engage with the driving-wheel I, so that the two rollers will receive the crushed grapes between them and carry them through.

The grapes to be crushed are placed in the hopper M in clusters just as they are taken from the vine. The teeth $g$ upon the cylinder E then draw the fruit down between the cylinder and the perforated concave, where they are ground by the opposing teeth. The juice passes through the concave, while the crushed grapes are carried to the opposite side of the cylinder and fall into the space C between the concave and side of the box, from whence they descend, through the opening in the bottom of the box and between the rollers, into a vat or other receptacle, in a fit condition to be placed in a press for squeezing out the juice. The stems, instead of falling into the space C, will cling to the teeth $g$ of the cylinder, from which they are removed by the curved teeth X on the shaft O, and dropped upon an apron, Y, from which they fall to the ground. The box A is mounted upon a frame which has four handles, Z, so that the mill may be carried from place to place.

Having thus described our invention, what we claim, and desire to secure by Letters Patent, is—

1. The semicircular box A, in combination with the perforated concave B having teeth $d$ and toothed cylinder E, substantially as and for the purpose above described.

2. The basket H, composed of bent bars $l\,l\,l$, in combination with the hopper M and toothed cylinder E, substantially as and for the purpose set forth.

3. The shaft O with its curved teeth X, in combination with the toothed cylinder E and basket H, substantially as and for the purpose above described.

In witness that the above-described invention is claimed by us we have hereunto set our hands and seals.

FERDINAND B. SCHOENSTEIN. [L. S.]
AUGUST KLEIN. [L. S.]

Witnesses:
  GEO. H. STRONG,
  BENJN. C. FABRE. (19)